Jan. 31, 1950  W. B. AHERN ET AL  2,495,915
ACCORDION HAND STRAP MOUNTING
Original Filed Dec. 19, 1946

INVENTORS.
WILLIAM B. AHERN.
ALBERT J. WALT.
BY
Lockwood Goldsmith & Galt.
ATTORNEYS.

Patented Jan. 31, 1950

2,495,915

UNITED STATES PATENT OFFICE 2,495,915

ACCORDION HAND STRAP MOUNTING

William B. Ahern and Albert J. Walt, De Kalb, Ill., assignors to The Rudolph Wurlitzer Company, Chicago, Ill., a corporation Original application December 19, 1946, Serial No. 717,168. Divided and this application April 14, 1948, Serial No. 20,986

4 Claims. (Cl. 84—376)

This invention relates to an accordion hand strap mounting adapted to be removably secured to and adjustably mounted on the bass section of an accordion, this application being a division of our application Serial No. 717,168, filed December 19, 1946, entitled "Accordion bass section."

It is the purpose of this invention to provide an adjustable mounting for a hand strap, including a strap adjusting wheel normally having a peripheral portion thereof protruding through a slot in the decorative shell or housing enclosing the bass action. In order that the decorative shell may be formed as a unit for removable mounting over the bass action, it is desirable to provide adjustable means for the hand strap which is retractible in a manner to be moved out of the way of the shell or housing when it is mounted over or removed from the action, and adapted to protrude through an opening in the side of the shell for manually adjusting purposes after the shell is in place. This is accomplished in the manner and by means of the mechanism hereinafter more fully set forth and described.

The full nature of the invention will be understood from the accompanying drawings and the following description and claims:

Figure 1:
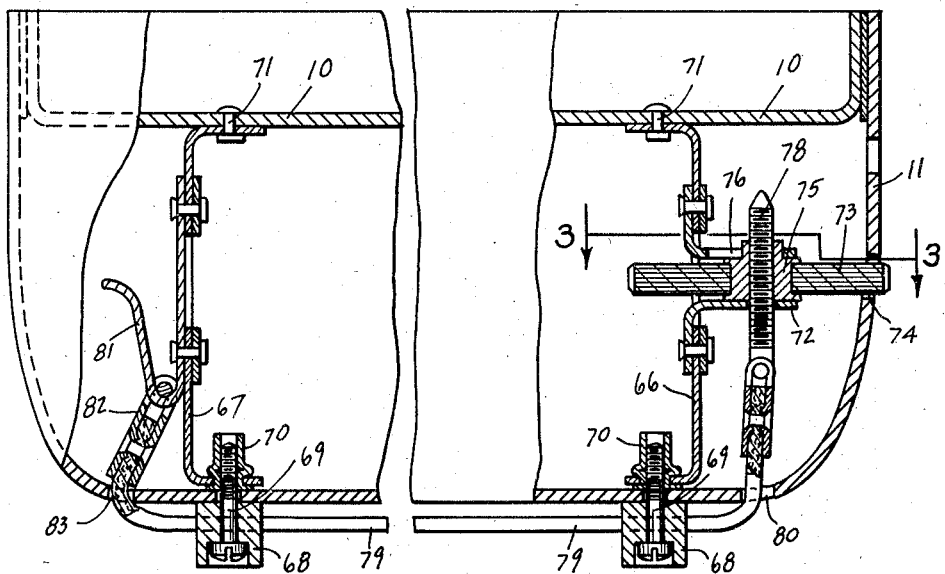
Fig. 1 is a central longitudinal section through the chassis support and shell housing of an accordion bass section with the intermediate portion broken away and illustrative of the hand strap and adjusting wheel in connected and operative relation.

In the drawings there is shown an accordion bass action including a chassis support 10 upon which the action mechanism is mounted, there being provided a housing shell 11 formed to fit over the action mechanism and be secured about a downwardly turned flange of the chassis support 10. Said chassis support is preferably formed of cast aluminum or sheet metal stamping, and the housing shell 11 may be formed of molded plastic, stamped sheet metal or any suitable material, such as to provide a decorative box.

Figure 2:
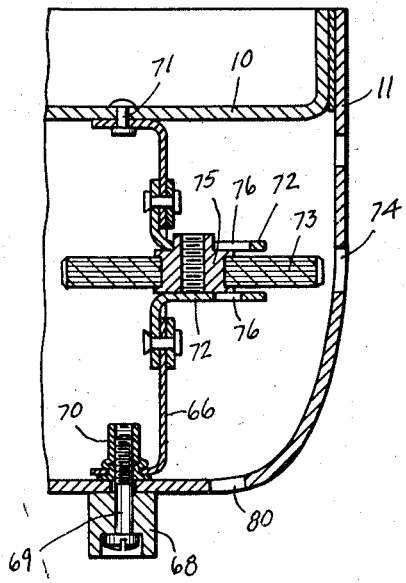
Fig. 2 is a view similar to the right-hand view of Fig. 1 showing the hand strap removed and the adjusting wheel therefor in retracted position.
Figure 3:
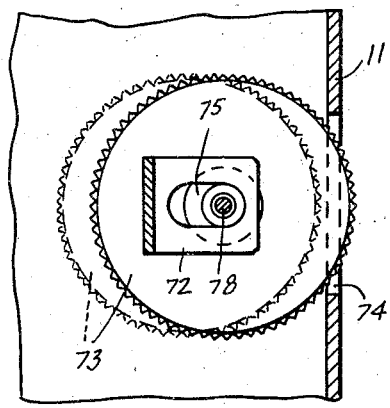
Fig. 3 is a section taken on the line 3—3 of Fig. 1.

Rigidly secured to the chassis support 10 at each end thereof there are strap supporting brackets 60 ad 67 by means of which the shell 11 is rigidly secured over the action mechanism when assembled. Adjacent each end of the shell there is an aperture over which the bars providing feet 68 are positioned, said feet being recessed and apertured to receive the locking bolts 69, said bolts passing through the apertures of the feet for threaded engagement with the threaded locking sleeves 70 secured to the upper flange of the respective supporting brackets, the opposed flange thereof being riveted at 71 to the chassis support 10. The bracket 66 carries laterally and outwardly extending supporting plates 72 in parallel spaced relation, to slidably receive and support a strap adjusting wheel 73 in horizontal relation to the chassis support and in alignment with an aperture 74 in the end wall of the shell so as to partially extend therethrough, as shown in Fig. 2. Said wheel is provided with an internally threaded hub 75 adapted to be moved into and out of alignment with the apertures 76 in the supporting plates 72. In assembling the shell 11 over the action mechanism the strap adjusting wheel 73 is retracted to the position shown in Fig 2 so as to be out of the way during assembly. After assembly it is locked in operative position, as shown in Fig. 1, after being moved to extend through the slot 74. In this position its threaded hub is aligned with the apertures 76 so as to receive a threaded stem 78 secured to one end of a hand strap 79 for extension through an opening 80 in the shell and into threaded engagement with the hub 75.

The bracket 67 has secured thereon a hook 81 adapted to removably receive a metal loop 82 secured to the other end of the hand strap for insertion through an opening 83 in the shell. After the shell has been assembled over the action mechanism and secured to the brackets by the bolts 69, the metal loop 82 of the strap is inserted through the opening 83 and dropped down to pass over the hook 81. Thereupon the opposite end of the strap connected to the threaded stem 78 is inserted through the opening 80 in the shell, and, with the adjusting wheel 73 moved to its operating position through the slot 74, entered into the threaded hub thereof for screw thread engagement therewith. Thereupon the adjusting wheel 73 is rotated to draw the stem inwardly, by which means the hand strap 79 may be loosened or tightened.

The invention claimed is:

1. An accordion bass section including a chassis support for a bass action, a housing shell removably mounted on said chassis support having slots provided therein, a hand strap having one end extending through a slot in said shell, means for anchoring said end to said chassis support, a hand strap adjusting wheel having an internally threaded hub, means on said chassis support for slidably mounting said wheel for movement to a position entirely within said shell and to an exposed position with a portion of its periphery extending through one of said slots in the end of said shell, and a threaded stem on the bearing end of said strap insertable through one of the slots of said shell and into the hub of said wheel for threading therein with said wheel in exposed position, the bearing for said wheel supporting it in fixed relation to said chassis support while permitting rotation thereof relative to said threaded stem for effecting adjustment of said hand strap.

2. An accordion bass section including a chassis support and a housing shell, a hand strap mounted externally of said shell with the ends thereof extending inwardly of said shell through slots formed therein, means for anchoring one end of said strap to said chassis support, a threaded stem on the other end of said strap extending into said shell for permitting strap adjustment, a strap adjusting wheel having a threaded hub for receiving said threaded stem for strap adjustment upon rotation relative thereto, and a bearing support for said wheel comprising a pair of spaced bearing members between which said wheel is rotatably supported, one of said members having an elongated bearing slot for rotatably receiving an extension of said hub to permit said wheel to be retracted from the end of said shell for mounting said shell thereover and moved to operating position with a portion of its periphery extending into an end slot of said shell when in operating position, the other of said bearing members having an opening therein for receiving said threaded stem to permit its threaded engagement within said hub when said wheel is moved to operative position and retain said wheel in said operative position for strap adjustment when said stem is threaded therein.

3. An accordion bass section comprising a chassis support, a pre-formed housing shell adapted to be removably mounted on said support, end support brackets for removably securing said shell thereto, a hand strap hook formed on one of said support brackets, a retractable hand strap adjusting wheel rotatably and slidably mounted on the other support bracket movable to retracted position thereon for permitting placement of the housing shell over said support, and a hand strap adapted to be extended through an aperture of said shell for engagement with said hook at one end and having a threaded stem at the other end insertable through an aperture in said shell into adjustable threaded engagement with said adjusting wheel when said wheel is moved from retracting position into operative position with a portion thereof extending through an aperture in the end of said shell.

4. An accordion bass section including a chassis support for a bass action, a housing shell carried by said chassis support to enclose the action, a supporting bracket secured to said support adjacent each end thereof, means for securing said shell to said bracket, said shell having slots adjacent thereto, one of said supporting brackets being formed with a hand strap anchor for removably securing a hand strap loop insertable through the adjacent slot of said shell, a hand strap adjusting wheel having an internally threaded bearing portion for receiving a threaded hand strap stem insertable through the adjacent slot of said shell when said wheel is in operable position, said bearing portion being slidably mounted on the other supporting bracket for movement to retracted position to permit placement of said shell thereover and to stem receiving position with a portion thereof projecting through a slot in the end of said shell for hand strap adjustment.

WILLIAM B. AHERN.
ALBERT J. WALT.

REFERENCES CITED

The following references are of record in the file of this patent:

UNITED STATES PATENTS

| Number | Name | Date |
| --- | --- | --- |
| 1,597,034 | Grebe | Aug. 24, 1926 |
| 2,134,854 | Bolster | Nov. 1, 1938 |
| 2,221,980 | Lindeberg | Nov. 19, 1940 |